July 22, 1952

E. P. KLINGLESMITH 2,604,372

TACKLE BOX

Filed Feb. 7, 1949

Eugene P. Klinglesmith
INVENTOR.

BY
*Thomas A. O'Brien
and Harvey B. Jackson*
Attorneys

July 22, 1952  E. P. KLINGLESMITH  2,604,372
TACKLE BOX

Filed Feb. 7, 1949  4 Sheets-Sheet 2

Eugene P. Klinglesmith
INVENTOR.

BY
Attorneys

July 22, 1952  E. P. KLINGLESMITH  2,604,372
TACKLE BOX
Filed Feb. 7, 1949  4 Sheets-Sheet 3
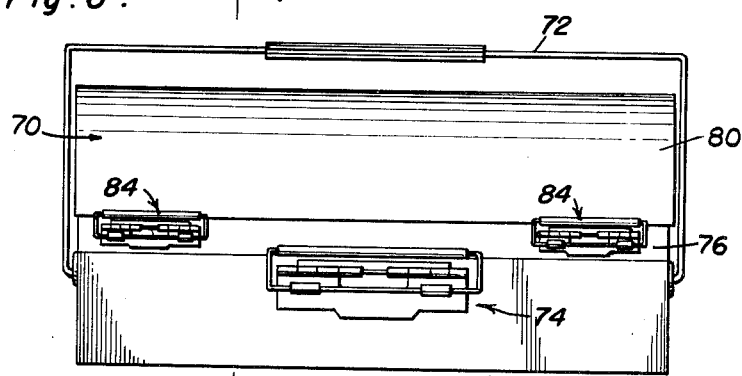
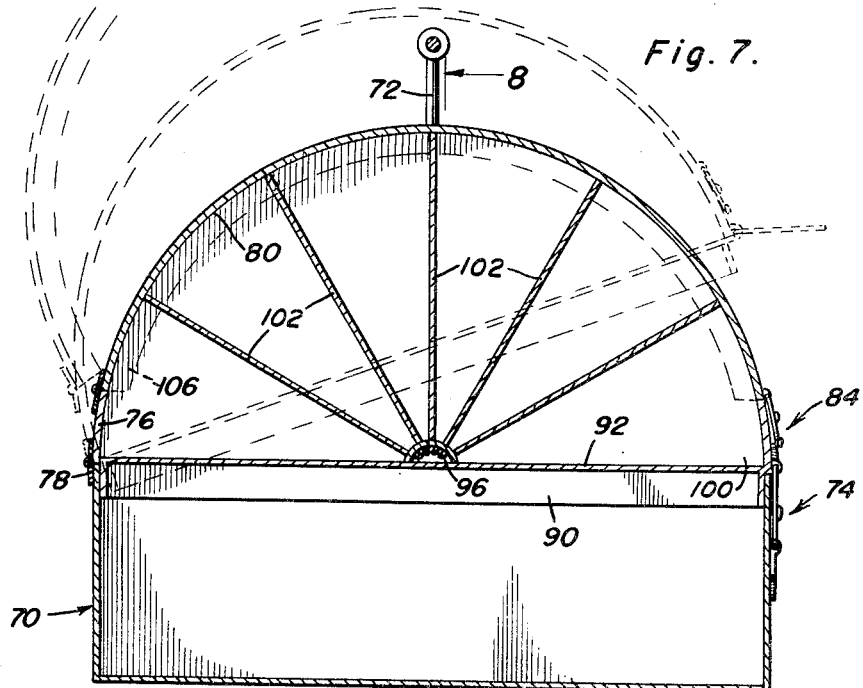
Eugene P. Klinglesmith
INVENTOR.

July 22, 1952  E. P. KLINGLESMITH  2,604,372
TACKLE BOX
Filed Feb. 7, 1949 4 Sheets-Sheet 4
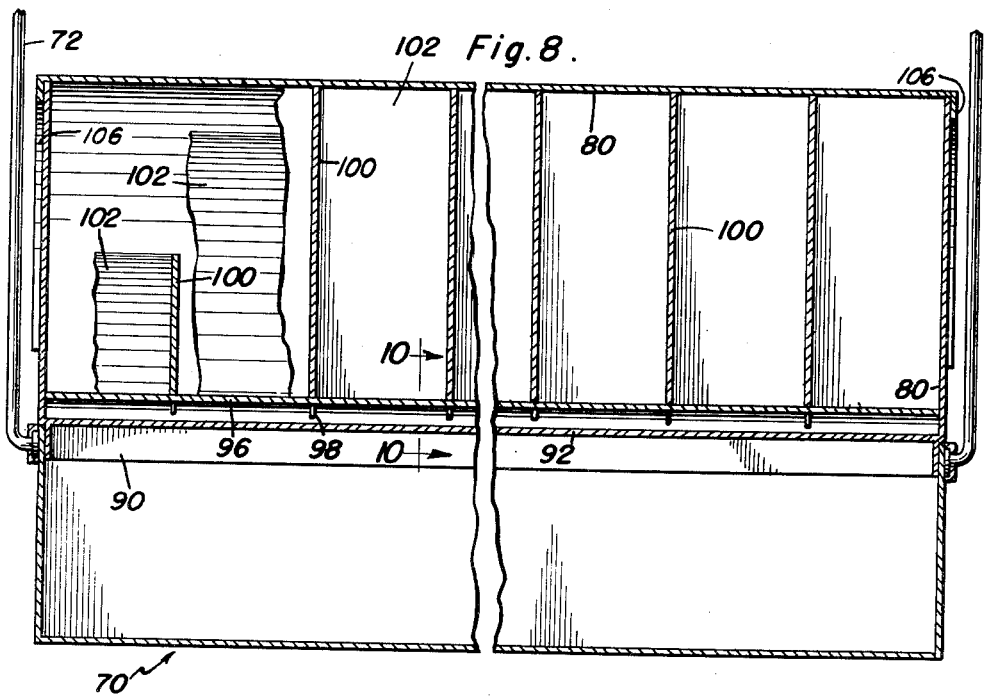
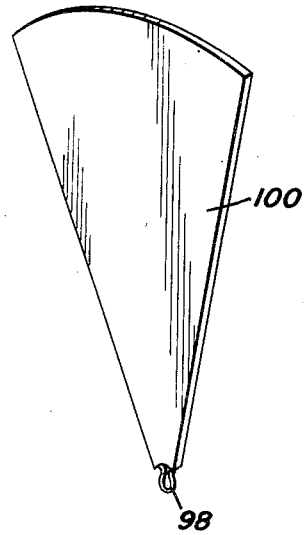
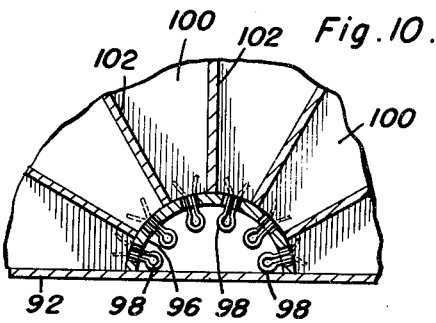
Eugene P. Klinglesmith
INVENTOR.
BY Clarence A. O'Brien
and Harvey B. Jackson
Attorneys Patented July 22, 1952

2,604,372

UNITED STATES PATENT OFFICE 2,604,372

TACKLE BOX

Eugene P. Klinglesmith, Vinita, Okla.

Application February 7, 1949, Serial No. 74,918

3 Claims. (Cl. 312—292)

This invention relates to novel and useful improvements in tackle boxes.

An object of this invention is to support fishing tackle and other appurtenances contiguous to the art and sport of fishing by an improved structure which includes a housing having a bottom, side walls and end walls, and a closure for the open top in the housing, the said closure embodying sections mounted in an arcuate plate, the sections being radially disposed with respect to a common center, and partitions dividing said sections into individual compartments.

Another object of this invention is to provide an improved closure for a housing which includes a number of radially disposed partitions fixed to a central shaft, the partitions and shaft being disposed in a curved plate, preferably cylindrical in this instance, and utilize a closure for the curved plate which is hingedly mounted on the housing.

A further object of this invention is to supply an improved tackle box which has a revolving member in the top thereof, which revolving member is swingable on a hinge construction for access not only to the compartments of the revolving top but also to the interior of the housing.

Ancillary objects and features of novelty such as simplicity of construction will become apparent to those skilled in the art, in following the description of the preferred forms of the invention, illustrated in the accompanying drawings, wherein:

Figure 6 is an elevational view of the second form of the invention;

Figure 7 is a sectional view taken substantially on the line 7—7 of Figure 6 and in the direction of the arrows;

Figure 8 is a vertical sectional view taken substantially on the line 8—8 of Figure 7 and in the direction of the arrows;

Figure 9 is a perspective view of one of the radially disposed partitions used in conjunction with the second described form of the invention, and;

Figure 10 is a sectional enlarged detailed construction taken substantially on the line 10—10 of Figure 8 and in the direction of the arrows.

Figure 1:
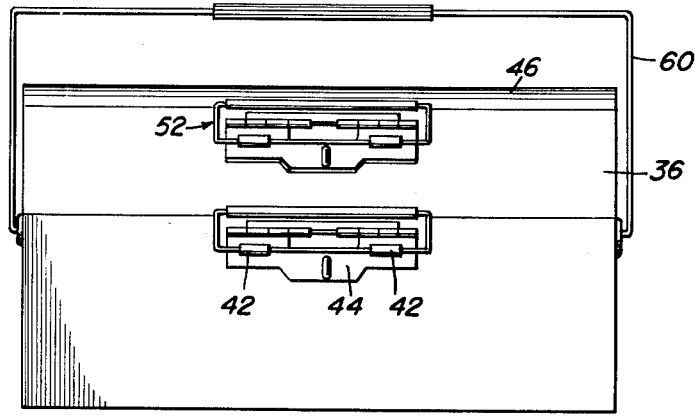
Figure 1 is an elevational view of one form of the invention.
Figure 2:
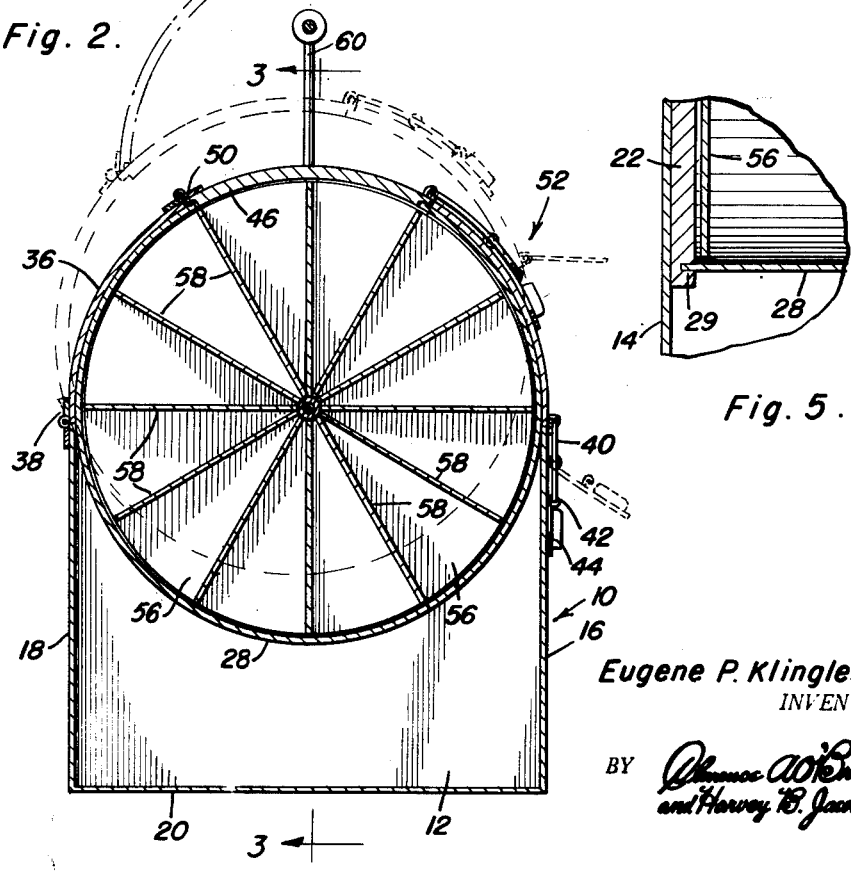
Figure 2 is a sectional view taken substantially on the line 2—2 of Figure 1 and in the direction of the arrows.
Figure 5:
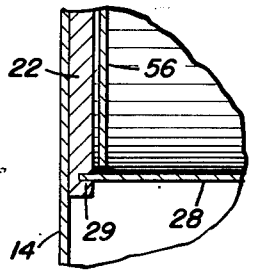
Figure 5 is an enlarged sectional detailed construction showing the means of attaching the arcuate plate to the support means therefor.

The structure of the first form of the invention is shown in Figure 1-5 inclusive. It includes a housing generally indicated at 10 and including end walls 12, 14 and side walls 16, 18 respectively as well as a bottom 20. Thus, a housing is formed with an open top for accommodation of a rotor which forms a closure for the said open top of the housing.

Identical side members 22 and 24 respectively form means for mounting the shaft 26 and arcuate plate 28. The said arcuate plate 28 is in this instance substantially cylindrical. The end members 22 and 24 have grooves 29 disposed on one face thereof extending partially therearound. The said groove 29 is concentric with apertures 30 which support the said shaft 26. Viewing the detail of construction shown in Figure 5 it is readily apparent that the ends of the cylindrical plate 28 are disposed in the respective grooves 29 of the end members 22 and 24. Since the grooves 29 do not extend completely around the end members, the arcuate plate 28 is not permitted to move with respect to the said end members.

A shoulder 32 is formed on the outside surface (surfaces opposite those having the grooves 29 therein) which rests upon the upper edges of the end walls 14 and 12 respectively. Lands 34 are provided at the top of each end member.

A smoothly contoured door 36 is hinged at one end by means of the conventional hinges 38 to the back wall 18 of the housing. The front of the door 36 has a latch associated therewith which is also associated with the front wall 16 of the housing. The preferable form of latch is one which includes a bail 40 pivoted to the door 36 and engageable in hooks 42 provided on the latch plate 44. The latch plate being hinged to the front wall 16 of the housing 10 is movable as shown and dotted in Figure 2 forming a dead center type lock or latch. Of course, other types of latches may be utilized, but the one illustrated and described is preferable.

A section or part of the door 36 which is indicated at 46 forms a closure for the rotor construction including the curved plate 28, shaft 26 and other structure to be described subsequently, This section or portion is hinged by means of the conventional hinges 50 to a remaining portion of the door 36 and has a latch construction generally indicated at 52 associated therewith and another remaining portion of the door. The said latch construction 52 is identical to that described in conjunction with the door 36 and the front wall 16 of the housing. Hence, it is seen that the door 36 being hinged to the wall 18, may be raised and lowered thereby permitting access to the rotor for lifting the rotor assembly and rendering access to the lower portion of the housing 10. However, the portion 46 is removably associated with the rotor in a hinged manner, whereby if it is found desirable, only the portion 46 can be raised thereby lending access to the internal structure of the entire general closure. The ends of the section 46 are disposed in the lands 34 mentioned above.

A plurality of radially disposed partitions 56 are provided in the arcuate plate 28 thereby forming sectional compartments. However, these sectional compartments are again divided through the utility of dividers or divider plates 58 which are also radially disposed with respect to the shaft 26, but are substantially normal to the said partition 56. This structure is clearly evident from inspection of Figure 4.

Figure 3:
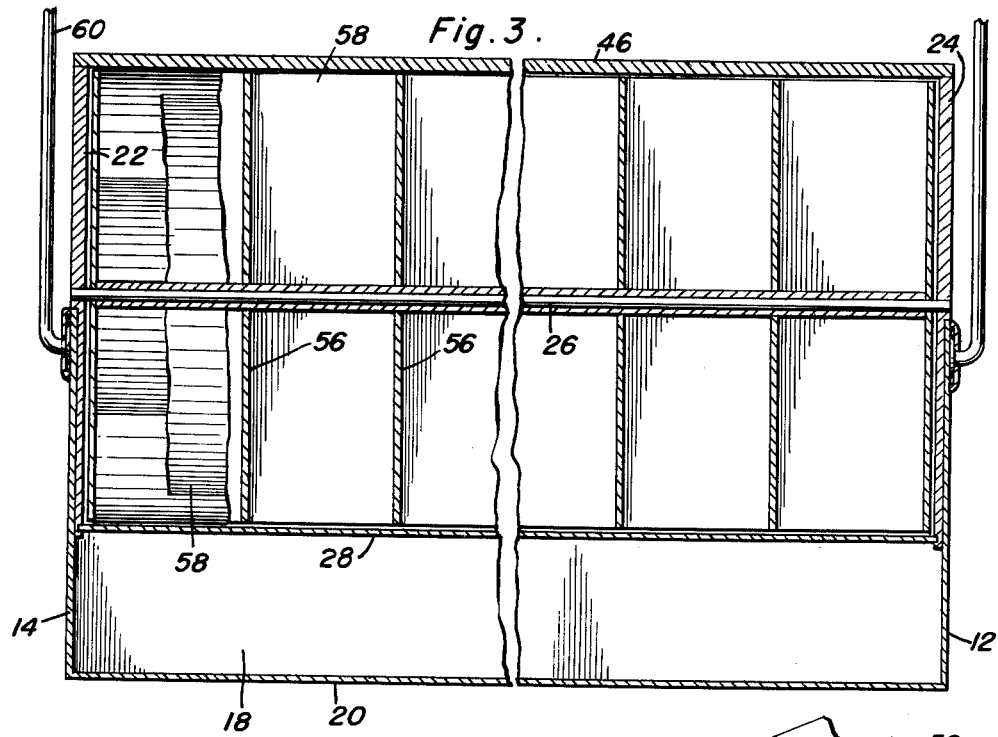
Figure 3 is a vertical sectional view taken substantially on the line 3—3 of Figure 2 and in the direction of the arrows.
Figure 4:
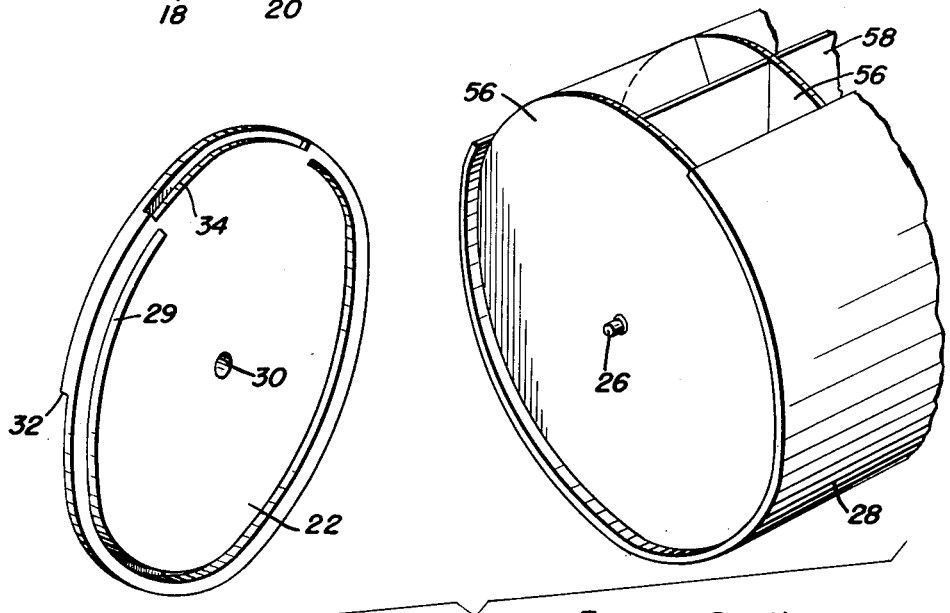
Figure 4 is an exploded perspective view illustrating details of construction of the arcuate plate, rotor member and means of supporting the arcuate plate and rotor member.

A suitable handle 60 is attached to the end walls 12 and 14 respectively either in a pivotal manner as disclosed in Figure 3 or rigidly, this being a matter of choice.

Inspection is now invited to Figures 6–10 inclusive wherein the second form of the invention is disclosed. This second form differs largely in the cover or closure for the open top receptacle or housing generally indicated at 70 disclosed therewith. This receptacle has the equivalent bottom, end and side walls respectively (equivalent to the first form of the invention) and utilizes a handle 72 identical to the said handle 60 as well as a similar type latch generally indicated at 74.

The differentiating structure is the substitution of a different type closure or top for the open housing. An arcuate plate 76 is connected with the back wall of the housing 70 by means of a conventional hinge 78. This arcuate plate has a door 80 hinged in its construction, forming a portion of the arcuate plate. A latch structure 84 is associated with the closure or door 80 and a remaining portion of the arcuate plate. It is noted that the said arcuate plate including the door portion 80 is substantially semi-cylindrical in shape.

A skirt 90 is slightly smaller than the internal dimensions of the housing 70 and fits therein in nesting relation therewith. This skirt extends from the outer edges of the bottom 92 for the hingedly mounted structure.

A semi-circular arcuate plate 96 is fixed longitudinally of the bottom 92 and on the upper surface thereof. A number of apertures (unnumbered) are provided in the arcuate member 96 for accommodation of the head 98 of the cotter pin wire clips which are disposed on the ends of the partitions 100. These partitions are in the form of segments of a plane circle and terminate at the arcuate plate 76. The said partitions 100 are radially disposed with respect to the hollow shaft like member 96. Dividers 102 are also radially disposed with respect to the member 96 but are substantially 90 degrees disposition with respect to the partition 100. By this means a number of divided compartments are supplied in the top or closure of the housing 70.

In order that a firm and proper fit may be afforded with respect to the door portion 80 of the arcuate plate, an external flange 106 depends from the portion 80 and fits on the outer side of the remainder of the arcuate plate.

While there has been described and illustrated a preferred form of the invention, it is appreciated that certain variations may be made without departing from the spirit of the invention. Accordingly, limitation is sought only in accordance with the following claims.

Having described the invention, what is claimed as new is:

1. In a tackle box, a housing having an open top, a closure for said open top and hinged to said housing, said closure having a bottom, a cover hinged to said bottom for movement relative thereto, an arcuate member disposed on said bottom and extending longitudinally of said housing, said arcuate member having a plurality of openings therein, longitudinal partitions secured to said arcuate member and disposed below said cover, and transverse partitions disposed between said longitudinal partitions having means disposed in said openings for retaining said transverse partitions fixed between said horizontal partitions.

2. The combination of claim 1 and said means comprising resilient wire members formed with heads, and said heads being disposed in said openings.

3. The combination of claim 2 and a handle secured to said housing, a latch releasably retaining said cover in a closed condition on said bottom, and a locking device releasably retaining said bottom in such position with respect to the open top of said housing that the open top of the housing is closed.

EUGENE P. KLINGLESMITH.

REFERENCES CITED

The following references are of record in the file of this patent:

UNITED STATES PATENTS

| Number | Name | Date |
|---|---|---|
| 408,230 | Goodrich | Aug. 6, 1889 |
| 470,567 | Hitch | Mar. 8, 1892 |
| 875,366 | Moore | Dec. 31, 1907 |
| 920,751 | Kersey | May 4, 1909 |
| 1,147,086 | Greenway | July 20, 1915 |
| 1,249,641 | Lefrancois | Dec. 11, 1917 |
| 1,418,324 | O'Connor | June 6, 1922 |
| 1,752,948 | Herrmann | Apr. 1, 1930 |
| 2,138,190 | Myers | Nov. 29, 1938 |
| 2,241,179 | Brenkert | May 6, 1941 |